(12) United States Patent
Weksler et al.

(10) Patent No.: US 11,770,623 B2
(45) Date of Patent: Sep. 26, 2023

(54) SINGLE CAMERA IMAGE DATA COLLECTION

(71) Applicant: Lenovo (Singapore) Pte. Ltd., Singapore (SG)

(72) Inventors: Arnold Weksler, Raleigh, NC (US); John C Mese, Cary, NC (US); Nathan Peterson, Oxford, NC (US); Russell Speight VanBlon, Raleigh, NC (US); Mark Delaney, Raleigh, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 137 days.

(21) Appl. No.: 17/388,616

(22) Filed: Jul. 29, 2021

(65) Prior Publication Data

US 2023/0032296 A1  Feb. 2, 2023

(51) Int. Cl.
*H04N 23/80* (2023.01)
*H04N 23/611* (2023.01)
*H04N 23/45* (2023.01)
*H04N 23/90* (2023.01)

(52) U.S. Cl.
CPC ............ *H04N 23/80* (2023.01); *H04N 23/45* (2023.01); *H04N 23/611* (2023.01); *H04N 23/90* (2023.01)

(58) Field of Classification Search
CPC ...... H04N 23/80; H04N 23/45; H04N 23/611; H04N 23/90; H04N 23/695; H04N 5/268
See application file for complete search history.

(56) References Cited

U.S. PATENT DOCUMENTS

| | | | | |
|---|---|---|---|---|
| 2004/0072568 | A1* | 4/2004 | Kim | H04W 52/28 455/445 |
| 2004/0223629 | A1* | 11/2004 | Chang | G06V 40/161 382/118 |
| 2005/0063566 | A1* | 3/2005 | Beek | H04N 7/181 348/E7.086 |
| 2013/0335618 | A1* | 12/2013 | Sugawara | G06F 3/04847 348/349 |
| 2019/0012809 | A1* | 1/2019 | Li | G06F 3/011 |
| 2020/0320731 | A1* | 10/2020 | Sheen | G01S 7/352 |

* cited by examiner

*Primary Examiner* — Hung H Lam
(74) *Attorney, Agent, or Firm* — FERENCE & ASSOCIATES LLC

(57) ABSTRACT

One embodiment provides a method, including: receiving, at a camera sensor associated with an information handling device, image data from a plurality of imaging ports, wherein the plurality of imaging ports are positioned around the information handling device; determining, using a processor, a primary imaging port from the plurality of imaging ports, wherein image data captured at the primary imaging port shows a front view of a user; and broadcasting, responsive to the determining, the image data from the primary imaging port. Other aspects are described and claimed.

20 Claims, 4 Drawing Sheets

SINGLE CAMERA IMAGE DATA COLLECTION

BACKGROUND

Individuals frequently utilize information handling devices ("devices"), for example smart phones, tablet devices, laptops and/or personal computers, hybrid devices, and the like, to communicate with other individuals. One common method of communication is video communication, colloquially known as "video chatting". Such a technique involves capturing, via one or more camera sensors associated with a user's device, images of the user and subsequently transmitting those images to other devices (e.g., via a dedicated video chatting application, a conferencing application, etc.).

BRIEF SUMMARY

In summary, one aspect provides a method, including: receiving, at a camera sensor associated with an information handling device, image data from a plurality of imaging ports, wherein the plurality of imaging ports are positioned around the information handling device; determining, using a processor, a primary imaging port from the plurality of imaging ports, wherein image data captured at the primary imaging port shows a front view of a user; and broadcasting, responsive to the determining, the image data from the primary imaging port.

Another aspect provides an information handling device, including: a camera sensor; a plurality of imaging ports; a processor; a memory device that stores instructions executable by the processor to: receive, at the camera sensor, image data from the plurality of imaging ports, wherein the plurality of imaging ports are positioned around the information handling device; determine a primary imaging port from the plurality of imaging ports, wherein image data captured at the primary imaging port shows a front view of a user; and broadcast, responsive to the determining, the image data from the primary imaging port.

A further aspect provides a product, including: a storage device that stores code, the code being executable by a processor and comprising: code that receives image data from a plurality of imaging ports, wherein the plurality of imaging ports are positioned around an information handling device; code that determines a primary imaging port from the plurality of imaging ports, wherein image data captured at the primary imaging port shows a front view of a user; and code that broadcasts, responsive to the code that determines, the image data from the primary imaging port.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
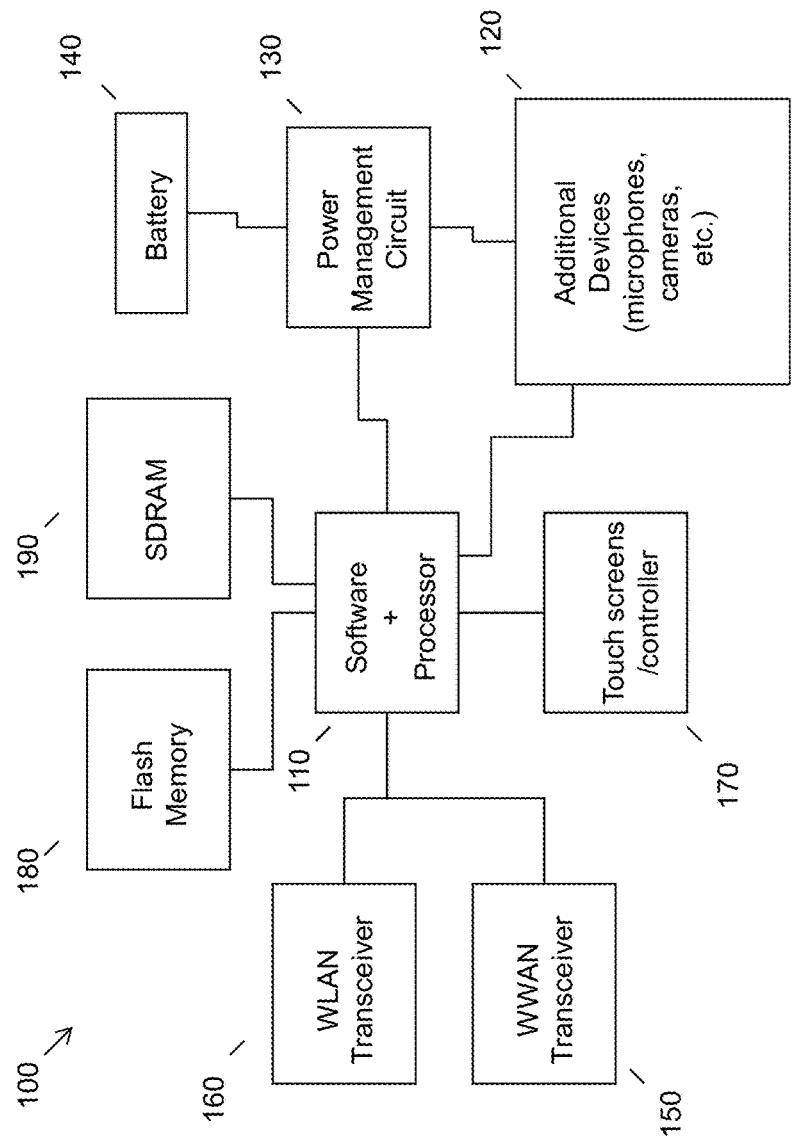
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When engaged in a video call or conversation, a user may sometimes appear to be looking away from the individual(s) they are talking to, resulting in an awkward interaction. Stated differently, from the call recipient's perspective, an individual may not be looking directly into a camera, but rather, may be looking toward another direction (e.g., off to the side, above or below the camera, etc.). These situations may result from: the inherent position of an integrated camera on a device (e.g., an integrated camera may be positioned at a location a user does not often look at when interfacing with the device, such as at a bottom or side portion of a bezel, etc.), the positioning of an external camera (e.g., a standalone camera may be positioned above a computer screen, to the side of the device, etc.), and/or because a user frequently looks around the screen during a call.

One conventional solution to the foregoing is for a user to adjust a position of a moveable camera around a monitor as the user glances at different sections of the screen. However, such a solution is manually intensive and extremely burdensome. Alternatively, a device used to facilitate the video call may contain multiple integrated cameras positioned around various portions of the display. Although this multi-camera implementation may provide a higher likelihood that the user's forward profile is captured and broadcast during the call, such a solution is very expensive and not always reasonable to implement, especially on smaller devices.

Accordingly, an embodiment provides a method of identifying, by utilizing a single camera solution, an imaging port capturing front profile image data associated with a user and subsequently broadcasting additional image data from that relevant imaging port. In an embodiment, image data may be received at a camera sensor of a device. The image data may be captured by a plurality of imaging ports (i.e., light gathering mechanisms) positioned around a device and subsequently transmitted to the camera sensor (e.g., via fiber optic cables, etc.). An embodiment may then determine a primary imaging port from the plurality of imaging ports. In an embodiment, the primary imaging port may be one of the plurality of imaging ports from which image data is transmitted that contains a front view of the user. Stated differently, the primary imaging port may be the port that the user is most directly facing/oriented towards. An embodiment may then subsequently broadcast images captured by the primary imaging port (e.g., to other individuals, etc.). Such a method may provide a single camera solution that ensures that the image data broadcast to others is substantially always of a front-view of the user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
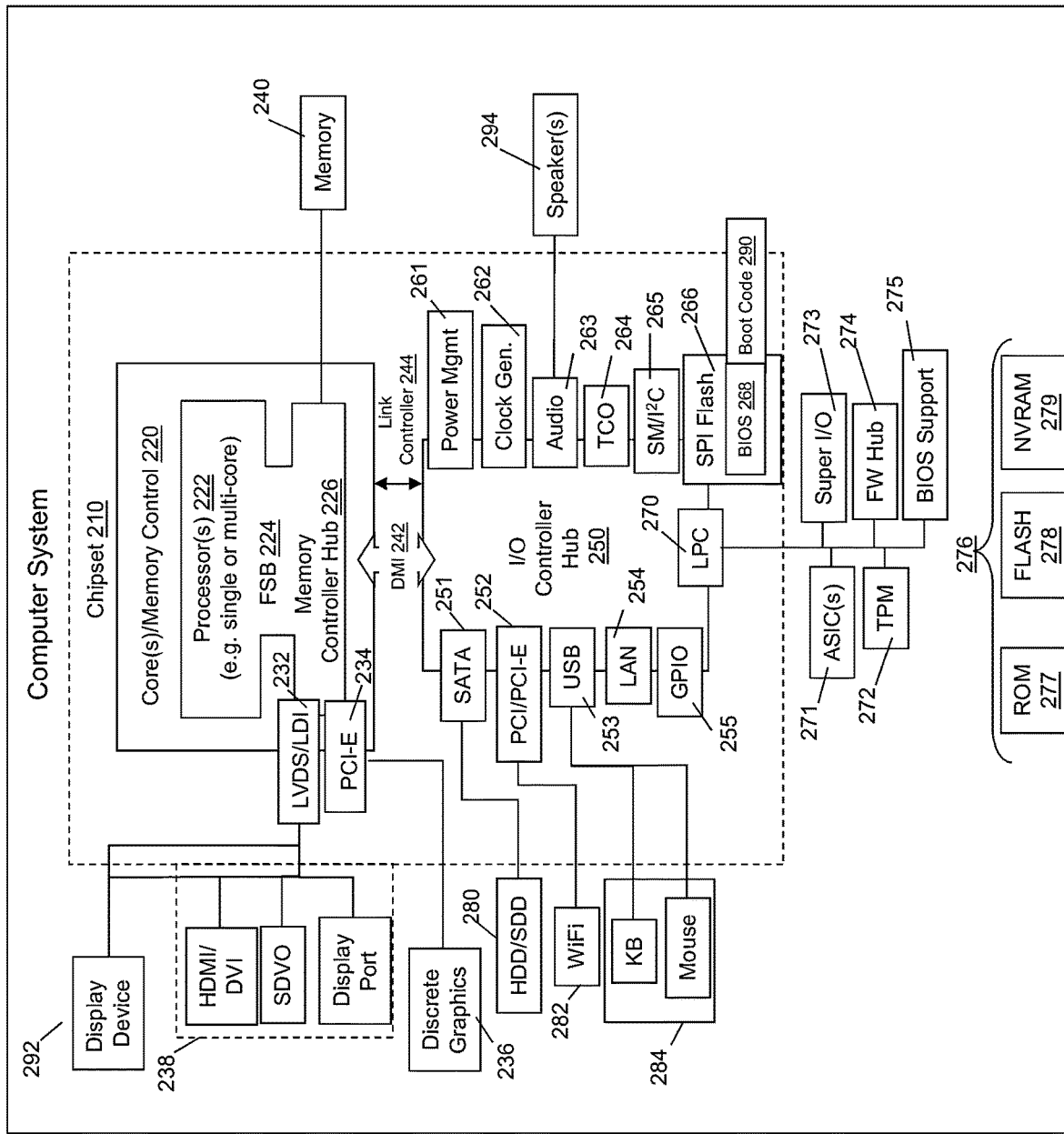
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling circuitry, as for example outlined in FIG. 1 or FIG. 2, may be used in devices that are capable of broadcasting video to other devices. For example, the circuitry outlined in FIG. 1 may be implemented in a smart phone or tablet embodiment, whereas the circuitry outlined in FIG. 2 may be implemented in a hybrid computing device.

Figure 3:
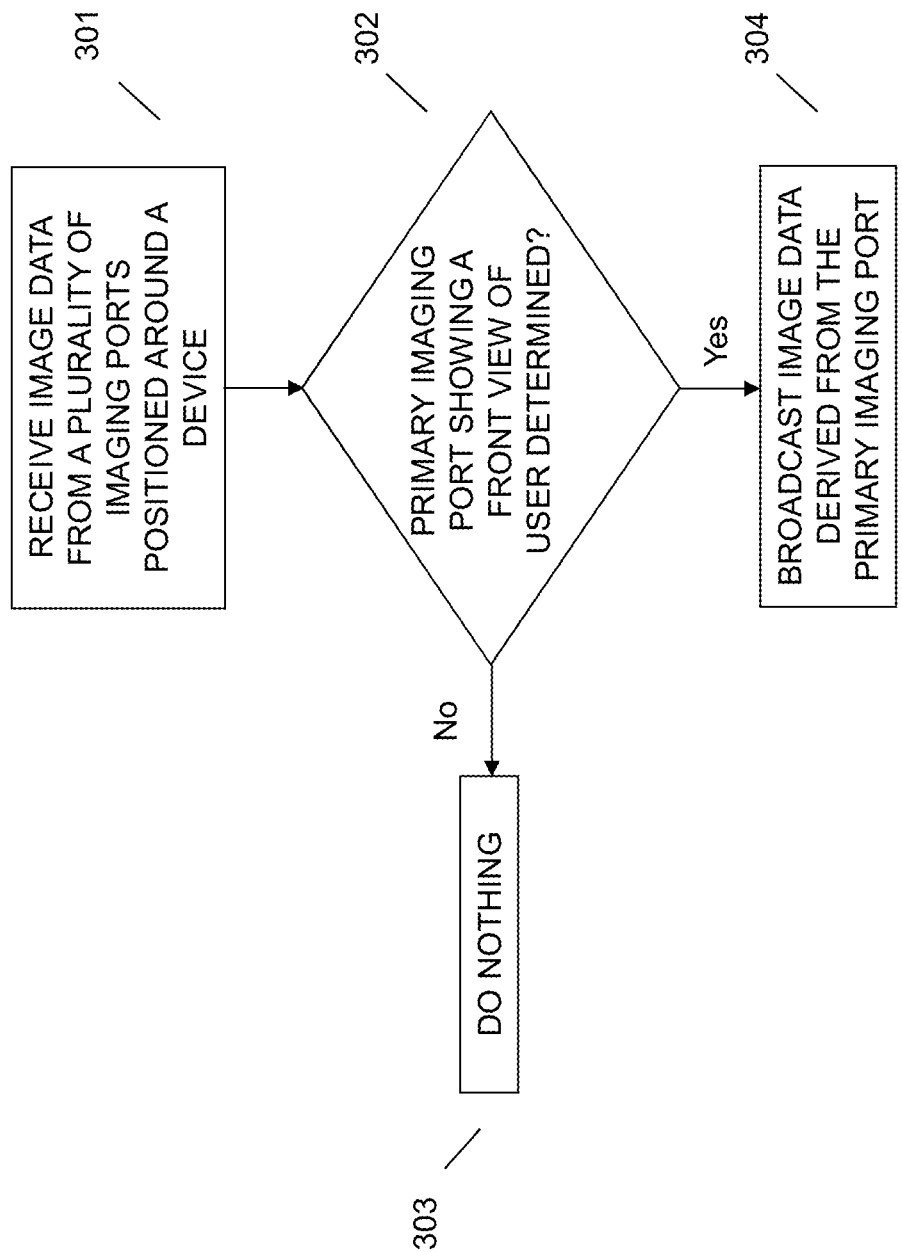
FIG. 3 illustrates an example method of broadcasting image data from an identified primary imaging port.

Referring now to FIG. 3, an embodiment provides a method of utilizing a single camera solution to broadcast a video of a user. At 301, an embodiment may receive image data (i.e., captured light) at a single camera sensor from a plurality of imaging ports. In an embodiment, the device may be virtually any device capable of supporting at least one integrated camera sensor that is able to receive and/or process image data. The camera sensor may be positioned at virtually any portion in or on the device (e.g., in a bezel area, in a notch area, underneath a portion of the display area, on top of a monitor, etc.).

In the context of this application, an imaging port ("port") may be a type of light gathering mechanism (e.g., a sensor, etc.). These ports may capture light substantially continuously, at predetermined intervals (e.g., every second, every five seconds, etc.), or in response to a predetermined event (e.g., when a query from the single camera sensor is received, etc.). In an embodiment, the plurality of ports may be positioned in and/or around the display screen. For instance, some or all of the ports may be positioned around portions of the bezel, within portions of the display area, or split between combinations of the foregoing. In an embodiment, virtually any number of ports may be utilized, the only limit being the size and/or space restrictions of a device. In an embodiment, some or all of the ports may be arranged in a forward facing orientation (i.e., facing a device user).

In an embodiment, each of the plurality of ports may be equipped with a fixed-focus lens to allow the captured light to be optically directed to the single camera sensor. More particularly, each port may be connected to the camera sensor by at least one fiber optic cable. The fiber optic cable may run through hardware behind the display screen and may not be visible to the user. Light captured at the port may then be guided to the camera sensor by the fiber optic cable. It is important to note that although the balance of this application discusses light transportation from the ports to the camera sensor using fiber optic cables, such a transport technique is not limiting. More particularly, other light transportation techniques, including those not explicitly described here, may also be utilized. For example, a network of mirrors or prisms may be positioned behind the ports to guide captured light from each port to the camera sensor.

Figure 4:
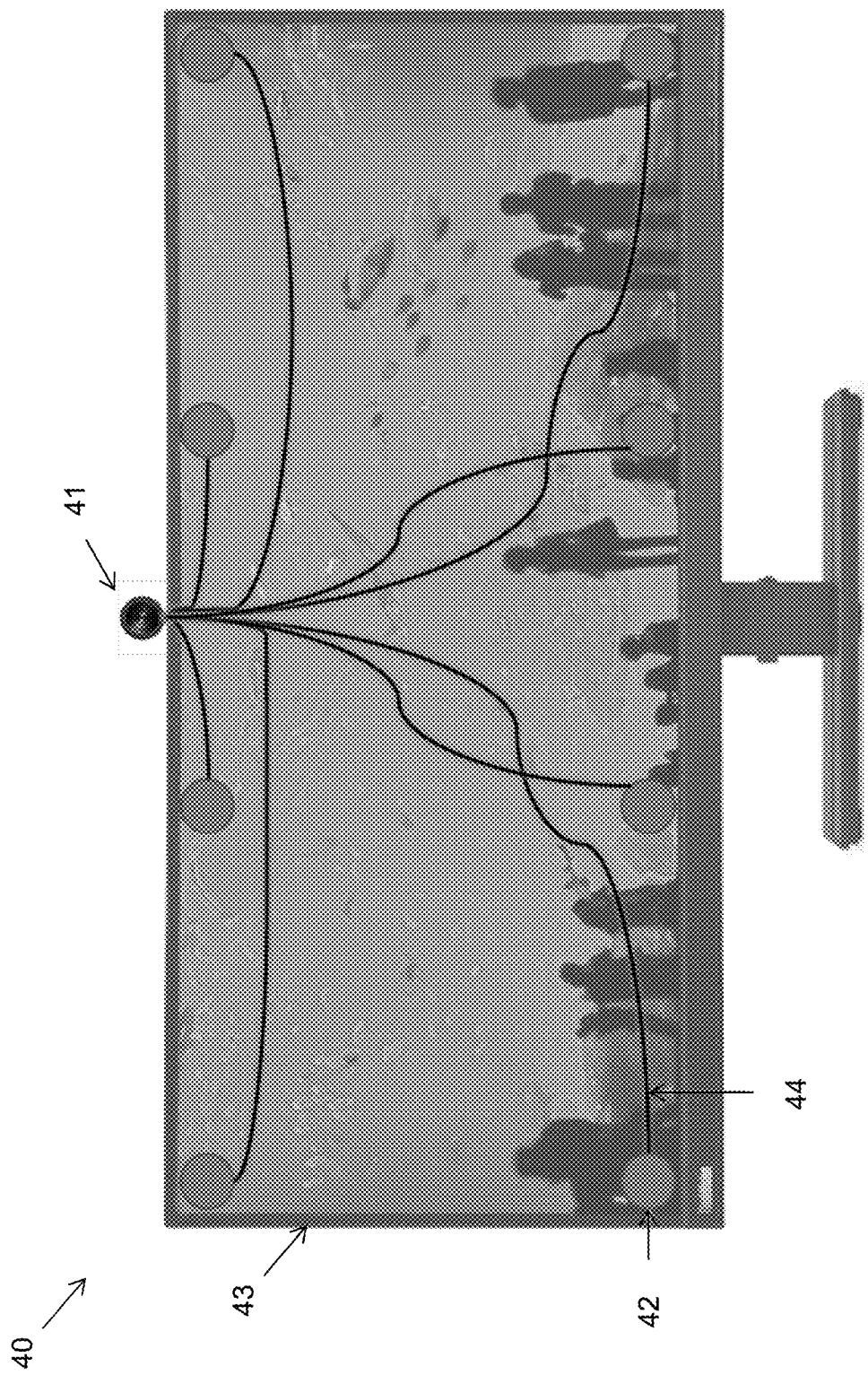
FIG. 4 provides an example implementation of a single camera image solution according to an embodiment.

Referring now to FIG. 4, a non-limiting example of a device comprising a plurality of imaging ports connected to a single camera sensor is provided. In an embodiment, a device 40 may contain a camera sensor 41 that is connected to a plurality of different ports 42 positioned around a monitor 43. The ports 42 may be connected to the camera sensor 41 by a series of fiber optic cables 44. Although visible in the illustration, the fiber optic cables 44 would run behind the monitor 43 and would not be visible to a user.

At 302, an embodiment may determine a primary imaging port from the plurality of imaging ports. In an embodiment, the primary imaging port may be the port from which captured image data provides the strongest indication of a user's forward profile (i.e., the primary imaging port may be the port that a user is substantially looking toward). Image data from the primary imaging port may then exclusively be broadcast to others, as further described herein.

In an embodiment, the determination of the primary port may be facilitated by first receiving, at the camera sensor, a unique image segment from each of the ports. The unique image segment may correspond to image data captured by each of the ports at a particular point in time. As briefly described above, the request to capture the unique image segment may be received at each of the ports (e.g., substantially simultaneously, etc.) from the camera sensor. This request may be broadcast when the camera sensor is active (e.g., when a user is utilizing an image or video-capture application, video conferencing application, or some other application requiring an active camera, etc.) and may be broadcast at predetermined intervals or in response to predetermined events.

Once received at the single camera sensor, an embodiment may then analyze, utilizing one or more conventional image analysis techniques known in the art, each of the unique image segments to identify which unique image segment renders a user's face best (i.e., the unique image segment that contains the best indication of a front profile of a user and/or the unique image segment that contains the highest proportion of identifiable user facial features). In this regard, each of the unique image segments may be assigned a ranking (e.g., a points ranking, percentile ranking, placement rank, etc.), based on the forward-facing nature of the captured image of the user's head, and the port producing the highest ranked unique image segment may be considered the primary port.

Additionally or alternatively to the foregoing, the primary imaging port may be the port from which captured image data provides a user-preferred presentation of their facial features. More particularly, a user may not want a particular facial feature highlighted and broadcast to others in a video call. In such a situation, a user may establish a list of image capture preferences (e.g., stored in a local or remote accessible database, etc.) that an embodiment may refer to when attempting to identify the primary imaging port. Specifically, the primary imaging port may be the port that an embodiment identifies as best satisfying requirements established by these preferences. As a non-limiting example of the foregoing, a user may have a scar on their left cheek that they are self-conscious of and may prefer to have the right side of their face focused on during the video call. In this situation, an embodiment may identify this user preference and thereafter establish, as the primary imaging port, the port from which captured image data provides the best profile of the right side of the user's face and/or the port from which the scar on the user's left cheek is the most hidden.

If a primary imaging port is unable to be determined, at 302, an embodiment may, at 303, take no additional action. Conversely, responsive to determining, at 302, a primary imaging port, an embodiment may, at 304, broadcast image data from the primary port. In an embodiment, this image data may be broadcast to one or more other individuals (e.g., other participants engaged in a video or conference call, etc.). Additionally or alternatively, the image data may be displayed on the user's display screen so that they may be able to identify whether the proper image data is being broadcast.

In an embodiment, image data may continue to be broadcast from the primary port until it is determined that the user is no longer looking at the primary port. More particularly, even as image data is being broadcast from the primary port, an embodiment may continue to receive and analyze images from all other ports in order to continually identify a current direction a user is facing. Responsive to identifying that a user is no longer facing the primary port (i.e., that image data derived from the primary port is no longer the highest ranked), an embodiment may switch the primary port to another port containing the highest ranked image data.

Although the foregoing disclosure primarily focused on an optical single-camera solution, a digital single-camera solution may be similarly implemented. More particularly, a plurality of ports may still be present and these ports may be connected to a single camera sensor via fiber optic cables. However, instead of light transmitted to a camera sensor, the fiber optic cables may transmit image data, captured at the ports, to a central processor within the device to digitally render the images. The analysis and identification of the primary port may thereafter substantially occur as previously described (i.e., in paragraph [0033]).

The various embodiments described herein thus represent a technical improvement to conventional methods for ensuring that a front profile of a user is broadcast to others. Using the techniques described herein, an embodiment may receive image data from a plurality of imaging ports positioned around a device. This image data may be analyzed to determine which of the ports a user is currently facing. Responsive to making this determination, an embodiment may then broadcast images derived from this primary port to other individuals. Such a method may ensure that broadcast video will always display a front profile of a user.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a camera sensor associated with an information handling device, image data from a plurality of imaging ports, wherein the plurality of imaging ports are positioned around the information handling device;
   determining, using a processor, a primary imaging port from the plurality of imaging ports, wherein image data captured at the primary imaging port shows a front view of a user; and
   broadcasting, responsive to the determining, the image data from the primary imaging port.

2. The method of claim 1, wherein the receiving the image data comprises directing light toward the camera sensor utilizing a direction system selected from the group consisting of: a fiber optic cable network, a mirror arrangement, and a prism arrangement.

3. The method of claim 1, wherein the plurality of imaging ports positioned around the information handling device comprise imaging ports positioned in at least one of: a bezel of the information handling device and within a display screen of the information handling device.

4. The method of claim 1, wherein the receiving the image data comprises receiving, from each of the plurality of imaging ports, a unique image segment.

5. The method of claim 4, wherein the determining comprises identifying the unique image segment comprising a frame with a highest proportion of facial features of the user.

6. The method of claim 5, wherein the frame with the highest proportion of facial features is identified via a ranking system.

7. The method of claim 4, wherein the determining comprises:
   accessing, from a database, an image capture preference; and
   identifying the unique image segment comprising a frame satisfying a requirement of the image capture preference.

8. The method of claim 4, wherein the receiving the unique image segment comprises receiving the unique image segment in response to a query broadcast by the camera sensor at a predetermined interval.

9. The method of claim 1, wherein the broadcasting comprises broadcasting the image data to at least one other device via a conferencing application.

10. The method of claim 1, wherein the broadcasting comprises broadcasting the image data until another one of the plurality of imaging ports is identified as the primary port.

11. An information handling device, comprising:
a camera sensor;
a plurality of imaging ports;
a processor;
a memory device that stores instructions executable by the processor to:
receive, at the camera sensor, image data from the plurality of imaging ports, wherein the plurality of imaging ports are positioned around the information handling device;
determine a primary imaging port from the plurality of imaging ports, wherein image data captured at the primary imaging port shows a front view of a user; and
broadcast, responsive to the determining, the image data from the primary imaging port.

12. The information handling device of claim 11, wherein the instructions executable by the processor to receive the image data comprise instructions executable by the processor to direct light toward the camera sensor utilizing a direction system selected from the group consisting of, a fiber optic cable network, a mirror arrangement, and a prism arrangement.

13. The information handling device of claim 11, wherein the plurality of imaging ports positioned around the information handling device comprise imaging ports positioned in at least one of: a bezel of the information handling device and within a display screen of the information handling device.

14. The information handling device of claim 11, wherein the instructions executable by the processor to receive the image data comprise instructions executable by the processor to receive, from each of the plurality of imaging ports, a unique image segment.

15. The information handling device of claim 14, wherein the instructions executable by the processor to determine comprise instructions executable by the processor to identify the unique image segment comprising a frame with a highest proportion of facial features of the user.

16. The information handling device of claim 15, wherein the frame with the highest proportion of facial features is identified via a ranking system.

17. The information handling device of claim 14, wherein the instructions executable by the processor to determine comprise instructions executable by the processor to:
access, from a database, an image capture preference; and
identify the unique image segment comprising a frame satisfying a requirement of the image capture preference.

18. The information handling device of claim 11, wherein the instructions executable by the processor to broadcast comprise instructions executable by the processor to broadcast the image data to at least one other device via a conferencing application.

19. The information handling device of claim 11, wherein the instructions executable by the processor to broadcast comprise instructions executable by the processor to broadcast the image data until another one of the plurality of imaging ports is identified as the primary port.

20. A product, comprising:
a storage device that stores code, the code being executable by a processor and comprising:
code that receives image data from a plurality of imaging ports, wherein the plurality of imaging ports are positioned around an information handling device;
code that determines a primary imaging port from the plurality of imaging ports, wherein image data captured at the primary imaging port shows a front view of a user; and
code that broadcasts, responsive to the code that determines, the image data from the primary imaging port.

* * * * *